(12) United States Patent
English

(10) Patent No.: US 6,395,979 B1
(45) Date of Patent: May 28, 2002

(54) DOOR BELL JUNCTION BOX

(76) Inventor: William English, 523 Fillbright St., Wilmington, NC (US) 28401

( * ) Notice: Subject to any disclaimer, the term of this patent is extended or adjusted under 35 U.S.C. 154(b) by 0 days.

(21) Appl. No.: 09/738,679

(22) Filed: Dec. 15, 2000

(51) Int. Cl.[7] .................................................. H01J 5/00
(52) U.S. Cl. ......................... 174/50; 174/58; 220/4.02; 248/906; 439/535
(58) Field of Search .............................. 174/48, 50, 53, 174/58, 63, 17 R; 220/3.6, 3.8, 4.02, 3.3, 3.94; 248/906; 439/535; 307/112

(56) References Cited

U.S. PATENT DOCUMENTS

| | | | | |
|---|---|---|---|---|
| 2,028,509 A | * | 1/1936 | Knell | 220/3.94 |
| 3,360,752 A | | 12/1967 | Uptegraff, Jr. | 336/59 |
| 3,365,535 A | | 1/1968 | Wilk | 174/50 |
| 3,472,945 A | * | 10/1969 | Trachtenberg | 174/53 |
| 3,579,044 A | | 5/1971 | Phillips, Jr. | 317/103 |
| 4,202,457 A | * | 5/1980 | Tansi | 220/3.3 X |
| 4,810,897 A | * | 3/1989 | Sholey | 174/52.1 X |
| 5,177,325 A | | 1/1993 | Giammanco | 174/50 |
| 5,510,948 A | | 4/1996 | Tremaine et al. | 361/90 |
| 5,594,207 A | * | 1/1997 | Fabian et al. | 174/58 |

FOREIGN PATENT DOCUMENTS

| | | | | |
|---|---|---|---|---|
| GB | 1086373 | * | 10/1967 | 174/50 |

* cited by examiner

Primary Examiner—Anthony Dinkins
Assistant Examiner—Dhiru R Patel
(74) Attorney, Agent, or Firm—Michael E. Mauney

(57) ABSTRACT

An electrical transformer box for mounting a low-voltage transformer partitioned into two spaces. A box-like transformer is divided by a partition into two volumes with the first volume being approximately one-half of the second volume. The transformer enclosure is nailed to a wall stud or fixed structure. Household current wires enter and exit into the smaller space. Wires connecting the household current pass through a bore in the partition into the larger space where a low-voltage transformer is mounted for connection to the household current wires. Low-voltage wires pass from the low-voltage transformer to a low-voltage appliance outside of the transformer enclosure.

5 Claims, 1 Drawing Sheet

DOOR BELL JUNCTION BOX

FIELD OF THE INVENTION

This invention relates generally to a housing for a transformer to change regular household current into the appropriate current for a door bell ringer.

BACKGROUND OF THE INVENTION

Electrical power is ordinarily generated in an electrical power plant. From the electrical power plant it has to be distributed into the power grid and ultimately directed to a commercial or residential user. Ordinarily, the power is distributed over lines at high voltages and current flow rates or amperages. As it approaches an area where it will be distributed to the ultimate user, the voltages and amperages must be stepped down or transformed into more appropriate voltages and amperages. This requires transformers. Consequently, transformer stations are fairly common in a given power distribution area. The power may then be distributed form this transformer station through overhead or underground lines into an area where it will then be distributed to individual users. But, again, the voltages and current flow rates frequently must be changed, which requires transformers on poles or mounted on concrete pads in neighborhoods. From these transformers, individual power lines at the usual voltage of 120 volts are directed to individual users or homes. Various types of housings for transformers to improve efficiency, to reduce the risk of fire or accidental shock, and provide better protection for the transformers have been proposed. For example, Giamnaco, U.S. Pat. No. 5,177,325, proposes an improved housing for an electrical transformer to reduce water leakage inside the transformer housing. Wilk, U.S. Pat. No. 3,365,535, shows a locking enclosure for a pad-mounted transformer. Uptegraff, U.S. Pat. No. 3,360,572, discloses an improved transformer housing that uses air for cooling and can be adopted for either indoor or outdoor installation.

However, the need for transformers does not end in a neighborhood power distribution center but also extends inside a building itself. For example, certain types of lighting, especially 12 or 24-volt halogen lighting, requires transformers to reduce the 120-volt standard household current to the appropriate current for such lighting requirements. For example, Tremaine et al., U.S. Pat. No. 5,510,948, discloses a power supply distribution center for a plurality of low-voltage lamps. This housing has three compartments with a removable power tray having a toroidal transformer, a low-voltage compartment which has a distribution center using a fuse panel for a plurality of fuses. Most hardware or contractor's supply stores have a variety of boxes, usually plastic, that can be used as junction boxes or switch boxes.

One type of specific household electrical application that requires the use of a transformer is a door bell ringer. The door bell ringer requires a transformer to step down household voltage to the appropriate voltage for the ringer mechanism. In conventional building applications, the ringer transformer is mounted outside of the walls, preferably out of sight in the closet or other concealed space, and connected by appropriate wiring to the door bell ringer. A push button system that completes the connection is mounted near an entrance or entrances of the home. When the button is pushed, the connection is completed closing the electrical circuit so that the door bell ringer will activate and sound a chime. Ideally, the push button, the door chimes, the transformer, and other electrical switches will all be in proximity to each other. In practice, it rarely works this way. Because the transformer is usually mounted outside the walls on a nail-on box, it must be mounted in an out-of-the-way place, otherwise, the visible portion of the box, transformer and electrical wires are an eye sore. By the same token, the chimes must be mounted in a place where they are likely to be heard by an occupant of the house when the doorbell ringer button is pushed. If mounted inside a closet in an out-of-the-way bedroom, the sounds created by the chimes might not be heard. This creates the need for running wiring from the push button, which is necessarily mounted near a door to a transformer, which is necessarily mounted in an out-of-the-way closet, or a concealed space to the chimes, which are necessarily mounted in a central area where they can be heard throughout the house. The wiring is run inside the walls and beneath paneling or sheet rock. The transformer and chimes are mounted outside of the walls. If there is a substantial delay between the time the wiring is originally run and the time the chimes and transformer are mounted, it can be difficult for the electrician to find the previously run wires that may have been covered by sheetrock. All this makes the electrical mounting and installation of a doorbell system more complicated than is necessary.

Consequently, it would be an advance in the art to provide a housing specifically designed for doorbell transformers and accompanying electrical equipment. The housing is sized so that it can be mounted between the studs, hence, placed beneath paneling, wall board, and the like so that it will be out of sight. Because the box is mounted between the studs and is ordinarily at least partially covered by wall board, paneling, and the like, the transformer can be mounted directly beneath the desired point of placement for the chimes themselves.

SUMMARY OF THE INVENTION

The current invention is an enclosure open on two of the six sides. The enclosure is divided by a partition, which separates the interior of the enclosure into two separate spaces. On a side of the enclosure, there is at least one bore or opening placed to allow the standard 120-volt household wiring, which connects to a junction within the housing. From this junction wires are run through an opening in the partition to a transformer placed within a partition portion of the enclosure. Again, there is a bore in the wall of the enclosure to allow low-voltage wires to be run from the transformer respectively to the push-button switch and to the chimes. The chimes can be mounted directly over the transformer, which is located between the studs and underneath wall board, sheet rock, paneling, or the like.

DETAILED DESCRIPTION OF THE DRAWINGS

Figure 1:
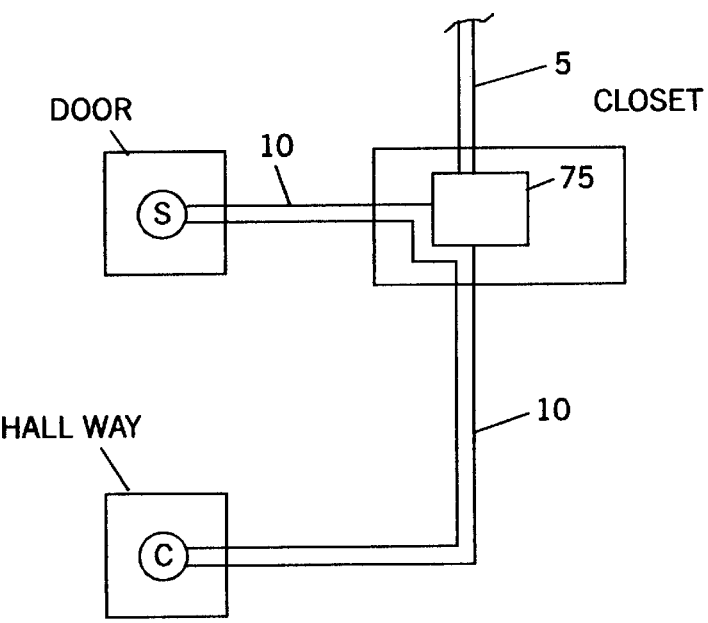
FIG. 1 is a stylized depictation of a prior art doorbell installation.

FIG. 1 is a stylized depictation of a prior art doorbell installation. Ordinarily, there is a switch (S) located at a door and chimes (C) located in a central area like a hallway. The switch (S) and the chimes (C) are connected by wiring (10) to a low-voltage transformer (75) which is ordinarily mounted outside of the wall in an out-of-the-way place like a closet. The transformer (75) is mounted to standard junction box( not shown) inside the wall. House current wires (5) are connected to the transformer (75) through the junction box. The transformer (75) steps down the house current to an appropriate current flow and voltage, which are then transmitted to the switch (S) by the wires (10) and to the chimes (C) by the wires (10).

Because houses are not designed for the convenience of an electrician installing door bells, the appropriate location for the chimes (C) may be many feet away from an appropriate location for the switch (S), both of which may be substantially removed from an appropriate location for the transformer (75). Thus, many feet of wiring (10) may be required to complete the installation. The prior art installation is undesirable for several reasons. First, the transformer (75) is mounted outside of the wall and can be unsightly, even in a closet ceiling. Secondly, the many feet of wiring required creates labor and materials expense in running the wiring as required by the varying locations. Third, if a substantial amount of time passes between the installation of the wiring, which is done before the completion of the interior walls, and the installation of the chimes, it may be difficult to locate where the wiring is beneath the paneling, wallboard, sheetrock, or the like. While a careful electrician will certainly know where the wiring is, this leaves room for human error, which should be avoided if possible.

Figure 2:
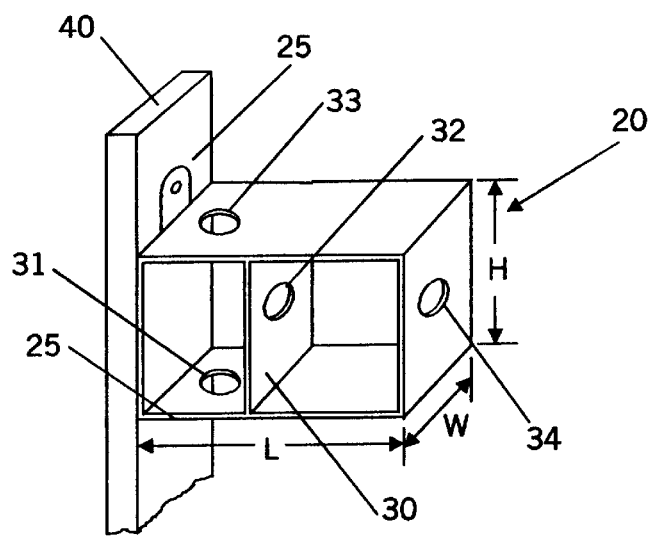
FIG. 2 is a perspective view of the current invention.

FIG. 2 shows the current invention transformer box (20) mounted on a stud (40). On one side of the transformer box (20) are two tabs (25) which allow the transformer box (20) to be nailed to the stud or attached by a screw or other convenient means. In this figure, the second tab (25) is not shown but can be seen in FIG. 3. The transformer box (20) is generally an oblong, rectangular box. Its dimensions are a length (L) of six inches, a width (W) of three inches, and a height (H) of four inches. There is a heightwise partition (30) in the box approximately two inches from the tabs (25) dividing the box on its lengthwise dimension into two separate areas—one area four inches in length the other two inches in length. In the partitioned area of the transformer box (20) that is 2"×3"×4"in size, there is at least one household wire bore (31). Wires from the household wiring are run into this portion of the transformer box (20) for connection to junctions. In some applications, it may be necessary to have a second household wire bore (33) in the top of the 2"×3"×4"partitioned side of the transformer box (20). Wires from the junctions (not shown) connect to the transformer box (20) mounted in the transformer bore (32) in the partition (30) into the transformer portion of the transformer box (20) which is 4"×3"×4"in size. Mounted in this area will be the transformer (75) (seen in FIG. 3), which transforms the household current into the appropriate voltage and current flow for transmission to the switch and to the chimes (switch and chimes not shown). There is a low voltage wire bore (34) which allows the low-voltage lines (10) to be run to the chimes and to the switch (chimes and switch not shown) from the transformer (75).

Figure 3:
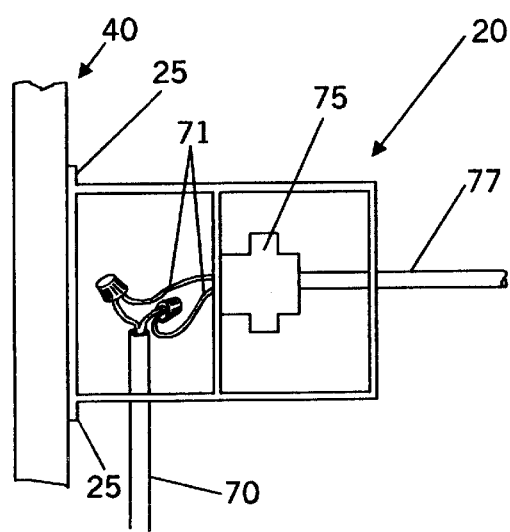
FIG. 3 shows the current invention with wiring and a transformer.

FIG. 3 shows in side view the current transformer box (20). It is mounted to a stud (40) by the tabs (25). A standard household current wire (70) passes through the household wire bore (31) (not shown). The household current wires (70) are spliced to wires (71) to connect to the transformer (75) mounted in the transformer bore (32). The transformer (75) transforms the household voltage into appropriate low-voltage for use by a low-voltage appliance like a door bell and door bell switch. If the chime is placed directly over the junction box, then the low-voltage wires may run out of the open face of the transformer portion of the transformer box (20) to a chime and back to the transformer box (20) where they will pass through a low voltage wire bore (34) (not shown) to a switch. When the switch is closed, it will complete the circuit causing current to pass from the transformer (75) through the low-voltage wires (77) through the now closed switch through the chime and back to the transformer (75) powering the chime. The bores (31, 32, 33, 34) are designed to use with standard fittings and the transformer (75) can mount directly to a fitting on the transformer bore (32). The height, width, and diameter of the transformer box (20) are designed to conveniently fit in the interior of a wall as defined by the studs and by the covering wall board, paneling, siding, and the like. The box must be compact enough to readily fit in the space provided in the stud, yet be large enough to provide working space for the electrician to make the appropriate connections and to hold a low-voltage transformer (75). Ordinarily, the transformer box (20) will have an open front and back. Although, in some areas, the building code may require the box to be closed off. The placement of bores in the transformer box (20), the partition with the appropriate space for mounting the transformer (75) all provide a significant advance over the prior art in terms of the convenience of use, construction and design for an electrician installing a low-voltage appliance like a door chime. It will be readily appreciated by one of ordinary skill in the art that variations are permitted within the scope of this invention and the invention is defined not by the foregoing Detailed Description of the Drawings, but rather the Claims which follow.

I claim:

1. An electrical transformer enclosure for mounting a low-voltage transformer comprising:
   (a) a four sided box;
   (b) a partition inside of said box dividing it into a first and a second space;
   (c) means for attaching said box to a wall stud or other fixed structure;
   (d) in said first space, at least one first bore in at least one of said sides of said four sided box whereby wires carrying household voltage current may pass from the exterior of said box into said first space;
   (e) a second bore in said partition whereby said wires carrying household voltage current may connect to a low-voltage transformer mounted in said second bore in said partition and within said second space and connected to said wires carrying household voltage current;
   (f) at least one third bore piercing a side of said four sided box whereby low-voltage wires may pass from said low-voltage transformer to the exterior of said four sided box for connection to a low-voltage appliance and switch outside of said box.

2. An electrical transformer enclosure for mounting a low-voltage transformer of claim 1 wherein said four sided box is generally rectangular in construction; said rectangular construction having a first, second, and third dimensions respectively of height, width, and length with said width dimension no greater than three and one-half inches whereby said four sided box may be mounted on a standard 2×4 stud in the interior of a wall construction where said 2×4 stud forms the framework for said wall construction.

3. An electrical transformer enclosure for mounting a low-voltage transformer of claim 2 wherein said height dimension and said length dimension are respectively approximately four and approximately six inches.

4. An electrical transformer enclosure for mounting a low-voltage transformer of claim 3 wherein said partition divides said four sided box along said length dimension and said first space having a first volume approximately one-half of a second volume of said second space.

5. An electrical transformer enclosure for mounting a low-voltage transformer of claim 4 wherein said means for attaching is at least one tab designed for receipt of a nail whereby said box is nailed to a stud using said tab.

* * * * *